US012800596B2

(12) United States Patent
Bornmann et al.

(10) Patent No.: US 12,800,596 B2
(45) Date of Patent: Nov. 17, 2026

(54) CONTROL LOOP-BASED VALUE ADJUSTMENT IN IN-VITRO DIAGNOSIS SYSTEMS

(71) Applicant: Siemens Healthcare Diagnostics Products GmbH, Marburg (DE)

(72) Inventors: Mike Bornmann, Marburg (DE); Ulrich Schröder, Lüneburg (DE)

(73) Assignee: Siemens Healthcare Diagnostics Products GmbH, Marburg (DE)

( * ) Notice: Subject to any disclaimer, the term of this patent is extended or adjusted under 35 U.S.C. 154(b) by 605 days.

(21) Appl. No.: 18/352,237

(22) Filed: Jul. 13, 2023

(65) Prior Publication Data

US 2024/0019452 A1 Jan. 18, 2024

(30) Foreign Application Priority Data

Jul. 14, 2022 (EP) .................................... 22184856

(51) Int. Cl.
*G01N 35/00* (2006.01)

(52) U.S. Cl.
CPC .............................. *G01N 35/00693* (2013.01)

(58) Field of Classification Search
CPC ... G01N 35/00693; G01N 2035/00702; G01N 35/00584
See application file for complete search history.

(56) References Cited

U.S. PATENT DOCUMENTS

| | | | | |
|---|---|---|---|---|
| 8,600,689 | B2 * | 12/2013 | Orihashi ................ | G01N 35/00 702/85 |
| 9,903,932 | B2 * | 2/2018 | Leibfritz ............ | G01R 31/3191 |
| 2006/0042964 | A1 | 3/2006 | Mansouri et al. | |
| 2019/0285659 | A1 | 9/2019 | Joseph et al. | |
| 2021/0263018 | A1 | 8/2021 | Taran | |

FOREIGN PATENT DOCUMENTS

| | | | |
|---|---|---|---|
| CN | 101038293 | A | 9/2007 |
| DE | 102019202633 | A1 | 5/2019 |
| JP | 2001165934 | A | 6/2001 |
| JP | 2017187473 | A1 | 10/2017 |
| JP | 2019527359 | A | 9/2019 |
| WO | WO2022065236 | A1 | 3/2022 |

* cited by examiner

*Primary Examiner* — Brian J. Sines
(74) *Attorney, Agent, or Firm* — Dugan & Dugan, PC

(57) ABSTRACT

The present invention relates to a system that makes it possible to provide a consistent result value by an in-vitro diagnosis device, comprising an in-vitro diagnosis device, at least one control unit, which is bidirectionally connected to the in-vitro diagnosis device and is configured to evaluate the deviation of an internal calibration/control measurement parameter from a defined standard value of the at least one in-vitro diagnosis device, the control unit being configured to modify the standard value, for which a deviating internal calibration/control measurement parameter has been detected, and to transmit the modified standard value to the in-vitro diagnosis device; and a corresponding method.

18 Claims, 2 Drawing Sheets

CONTROL LOOP-BASED VALUE ADJUSTMENT IN IN-VITRO DIAGNOSIS SYSTEMS

CROSS REFERENCE TO RELATED APPLICATION

This claims priority to European Patent Application No. EP 22184856.7, filed Jul. 14, 2022, which is hereby incorporated by reference herein in its entirety for all purposes.

TECHNICAL FIELD

The present invention relates to a system that makes it possible to provide a consistent result value by an in-vitro diagnosis device.

BACKGROUND

In-vitro diagnosis (IVD) systems measure qualitative and quantitative results of a plurality of parameters of the state of health with the aid of patient samples. The patient samples are usually fluids such as blood, serum, plasma, or urine. Each parameter is generally based on a specific biochemical test that is capable of reacting with the patient sample so that the results can be measured by an IVD analysis device. These highly automated analysis devices can process patient samples and parameterize specific assays with their reagent components, in order to obtain a patient result. The patient results are then typically communicated to the health service provider, and may indicate a normal or abnormal state of health of the patient. For quantitative tests, ranges for classifying a status within or outside the target values are generally established. It is therefore very important that the in-vitro diagnosis systems can reproduce results with a low variability. If the spread of the results is too great, the diagnosis is compromised and a correlation of the measurement results with one another and as a function of time becomes difficult or is prevented.

In order to reduce the variability in the measurement results and to ensure accuracy and correctness of the measurement results, in order to reflect the status of a patient faithfully and correctly in relation to a parameter in question, reagent batches are typically provided with batch-specifically assigned target values, which are taken into account when carrying out the test and are modified after changing a batch. Varying target values, however, conflict with the concept of established medical decision points for the description of diagnostically relevant statuses.

Furthermore, each assay typically has a control system, that is to say, standardized control material is tested daily or weekly before actual patient samples can be examined. Values, which must lie in particular ranges in order to confirm the functional capability of the in-vitro diagnosis system, are assigned to the control material. The variance of these ranges may be up to 20%, so that the variability of the results is greatly increased. If the values of the control materials of individual systems lie outside the aforementioned range, system-specific values that make it possible to define individual system properties may be requested.

The aforementioned measures for reducing the variability of the measurement results show that the former procedure can lead to inaccuracies in the measurement of patient samples and to delays in diagnosis.

BRIEF SUMMARY OF THE INVENTION

The object of the present invention is therefore to provide methods and means that make it possible to carry out in-vitro diagnosis methods more accurately and to ensure the provision of consistent result values.

This object is achieved by the subjects of the independent claims. The dependent claims reflect further advantageous aspects of the invention.

The invention firstly relates to a system, comprising:

at least one in-vitro diagnosis device, which is configured to carry out a diagnostic assay, the in-vitro diagnosis device being configured to detect a deviation of an internal calibration/control measurement parameter from a defined standard value, or a calibration curve, and forward it to a control unit;

at least one control unit, which is bidirectionally connected to the at least one in-vitro diagnosis device and is configured to evaluate the deviation of an internal calibration/control measurement parameter from a defined standard value of the at least one in-vitro diagnosis device, the control unit additionally accessing data from a database for the evaluation;

wherein the control unit is configured to modify the standard value, for which a deviating internal calibration/control measurement parameter has been detected, and to transmit the modified standard value to the in-vitro diagnosis device that detected the deviation, in order to make it possible to provide a consistent result value by the in-vitro diagnosis device.

This system advantageously makes it possible to carry out regulation-based value adjustment and thereby to increase the accuracy of the measurement results and provide batch- and influence-independently consistent result values over a long period of time.

In one preferred embodiment, the internal calibration/control measurement parameter is a parameter that is associated with the assay reagents used for carrying out the in-vitro diagnosis.

In another preferred embodiment, the internal calibration/control measurement parameter is a device system component parameter.

In another preferred embodiment of the system according to the invention, the control unit is configured to evaluate deviations from a defined standard value as a function of assay reagent batches used, the device system components, or the device type.

In another preferred embodiment of the system according to the invention, the at least one in-vitro diagnosis device is configured additionally to forward measurement data of a patient sample measured with an assay (patient assay) to the control unit.

It is furthermore preferred for the control unit additionally to be configured to evaluate the measurement data of the patient assay with the aid of previous measurement data of patient assays, controls and/or calibrations.

In another preferred embodiment of the system, the evaluation comprises a comparison of the deviations of an internal calibration/control measurement parameter and optionally measurement data of patient assays of a multiplicity of in-vitro diagnosis devices.

In another preferred embodiment of the system according to the invention, the control unit is configured to access a database containing data relating to the measurement or calibration/control measurement parameters associated with the assay reagents and/or containing data relating to the device system component parameters and/or containing data relating to the patient assays.

It is furthermore preferred for the standard value to be modified by a correction factor that is determined on the basis of (i) an individual deviation of an in-vitro diagnosis device from a standard value, (ii) an assay reagent batch-dependent deviation of a plurality of in-vitro diagnosis devices from a standard value, (iii) a deviation of measurement data of patient assays from previous measurement data of patient assays, (iv) a device type-dependent deviation of a plurality of in-vitro diagnosis devices from a standard value, (v) a device system component-dependent deviation of a plurality of in-vitro diagnosis devices from a standard value, (vi) a deviation of the measurement or calibration/control measurement parameters from measurement or calibration/control measurement parameters in a multiplicity of in-vitro diagnosis devices and/or (vii) a combination of a device system component-dependent deviation, an assay reagent batch-dependent deviation and/or a deviation from measurement data of patient assays.

In additional preferred embodiments, the present application relates to a system as described above, wherein the at least one in-vitro diagnosis device is configured to detect the deviation of an internal calibration/control measurement parameter from a defined standard value once per hour, per 12 h, per day, per 2, 3, 4, 5, 6 days, per week, per 2, 3 weeks, per month, per 2, 3, 4, 5, 6, 7, 8, 9, 10, 11 months, per year or over the life cycle of the in-vitro diagnosis device, the assay reagents or a system component or a part of the life cycle, and forward it to the control unit.

In another aspect, the application relates to a method for modifying a defined standard value of an internal calibration/control measurement parameter of at least one in-vitro diagnosis device, wherein the internal calibration/control measurement parameter measured in the in-vitro diagnosis device has a deviation from the standard value, comprising forwarding of the deviation to at least one control unit, evaluation of the deviation in the control unit and transmission of a standard value modified on the basis of the deviation to the in-vitro diagnosis device that detected the deviation, wherein optionally measurement data of a patient assay are additionally forwarded to the control unit, and wherein preferably the deviation from initial measurements of the internal calibration/control measurement parameter, and more preferably the deviation of the internal calibration/control measurement parameter from a defined standard value, is detected and forwarded once per hour, per 12 h, per day, per 2, 3, 4, 5, 6 days, per week, per 2, 3 weeks, per month, per 2, 3, 4, 5, 6, 7, 8, 9, 10, 11 months, per year or over the life cycle of the in-vitro diagnosis device, the assay reagents or a system component or a part of the life cycle.

In another preferred embodiment of the method according to the invention, the internal calibration/control measurement parameter is a parameter that is associated with the assay reagents used for carrying out the in-vitro diagnosis, or is a device system component parameter.

In an additional preferred embodiment, the evaluation of the deviation from a defined standard value is carried out as a function of assay reagent batches used, the device system components, and/or the device type.

In another preferred embodiment of the method according to the invention, the evaluation comprises a comparison of the deviations of an internal calibration/control measurement parameter of a multiplicity of in-vitro diagnosis devices.

In an additional preferred embodiment of the method according to the invention, the standard value is modified by a correction factor that is determined on the basis of (i) an individual deviation of an in-vitro diagnosis device from a standard value, (ii) an assay reagent batch-dependent deviation of a plurality of in-vitro diagnosis devices from a standard value, (iii) a deviation of measurement data of patient assays from previous measurement data of patient assays, (iv) a device type-dependent deviation of a plurality of in-vitro diagnosis devices from a standard value, (v) a device system component-dependent deviation of a plurality of in-vitro diagnosis devices from a standard value, (vi) a deviation of the measurement or calibration/control measurement parameters from measurement or calibration/control measurement parameters in a multiplicity of in-vitro diagnosis devices and/or (vii) a combination of a device system component-dependent deviation, an assay reagent batch-dependent deviation and/or a deviation from measurement data of patient assays.

DETAILED DESCRIPTION OF EMBODIMENTS

Figure 1:
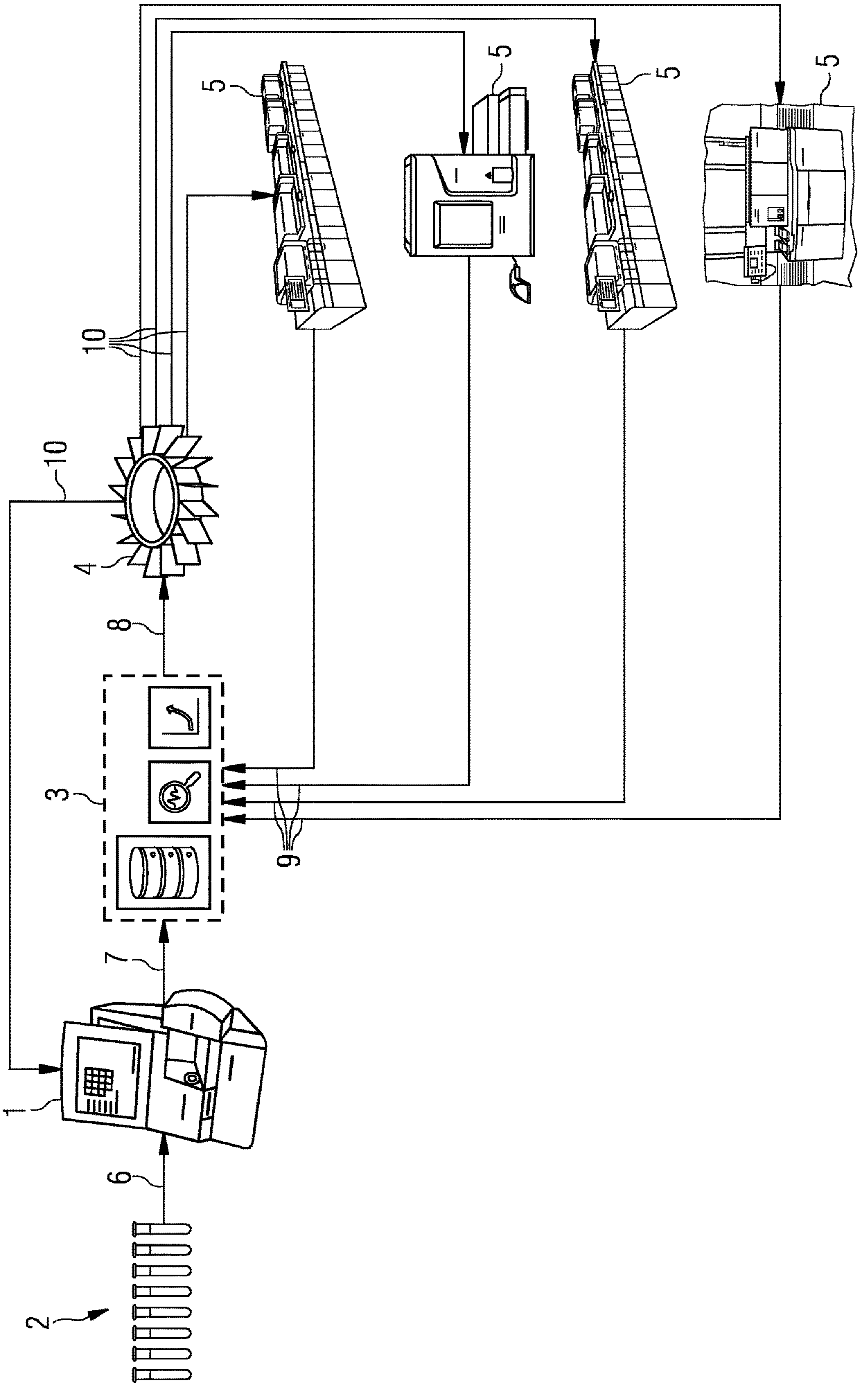
FIG. 1 shows one embodiment of the system according to the invention, in which measurement results of an assay (2) are firstly obtained (6) in an in-vitro diagnosis device (1) and checked for deviations of an internal calibration/control measurement parameter from a defined standard value. Corresponding values are forwarded (7) to a control unit (3). The control unit is in this case connected to a correcting element (4), which transmits (10) a standard value modified by the control unit to the in-vitro diagnosis device (1) after it is sent (8). At the same time, the modified standard values are forwarded to additional in-vitro diagnosis devices (5), for example in hospitals or at other locations. Comparison values thereby generated by the latter are transmitted back to the control unit (3), so that bidirectional data exchange (9, 10) is set up.
Figure 2:
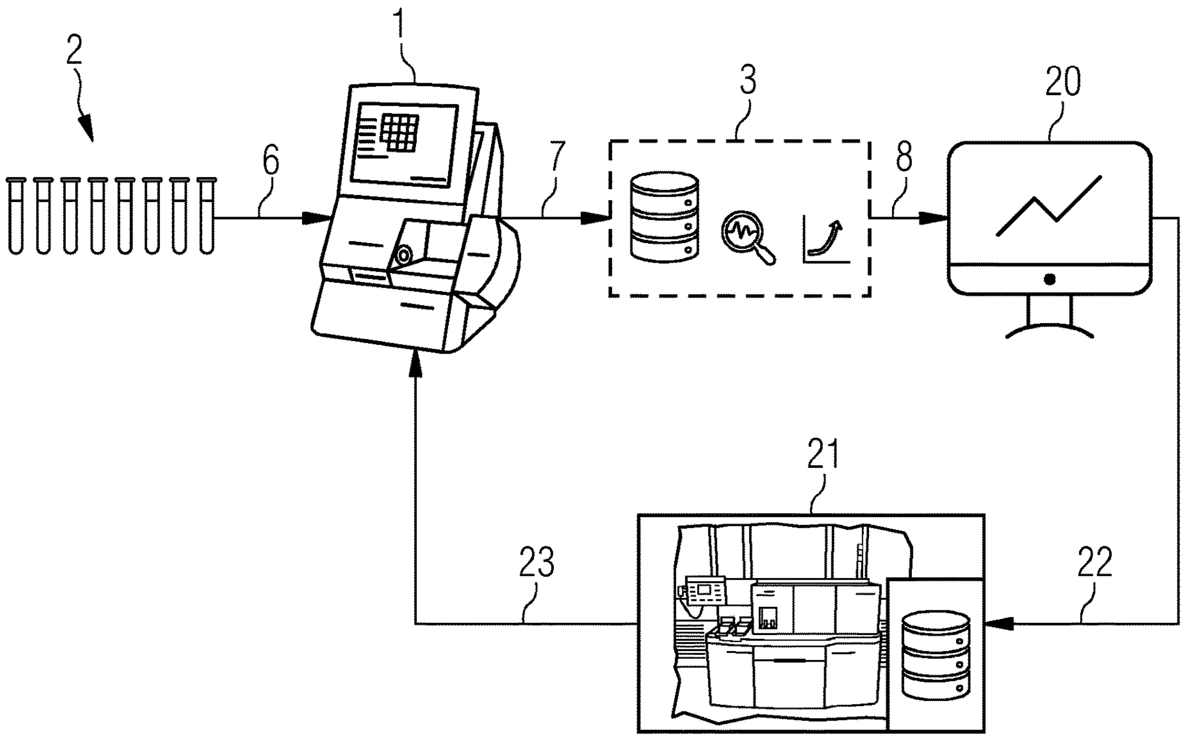
FIG. 2 shows another embodiment of the method according to the invention, which essentially corresponds to the system shown in FIG. 1 with the difference that the control unit interacts (8) with an application (20) that transmits the standard value modified by the control unit via a network (22) to a further device (21) for application correction or adjustment of the parameter settings, this further device being connected to the in-vitro diagnosis device and thus allowing bidirectional interaction.

Although the present invention is described with respect to particular embodiments, this description is not to be construed in a limiting sense.

Before describing in detail exemplary embodiments of the present invention, definitions important for understanding the present invention are given.

As used in this description and in the appended claims, the singular forms of "a" and "an" also include the respective plural forms, unless the context clearly dictates otherwise.

In connection with the present invention, the terms "approximately" and "about" refer to an interval of accuracy that a person skilled in the art understands to still ensure the technical effect of the feature in question. The term typically indicates a deviation from the indicated numerical value of ±20%, preferably ±15%, more preferably ±10% and even more preferably ±5%.

It is to be understood that the term "comprising" is not limiting. For the purposes of the present invention, the term "consisting of" or "essentially consisting of" is considered to be a preferred embodiment of the term "comprising of".

If hereinafter a group is defined to comprise at least a certain number of embodiments, this is meant to also encompass a group which preferably consists of these embodiments only.

Furthermore, the terms "(i)", "(ii)", "(iii)" or "(a)", "(b)", "(c)", "(d)" or "first", "second", "third", etc., and the like in the description or in the claims are used for distinguishing between similar elements and not necessarily for describing a sequential or chronological order.

It is to be understood that the terms so used are interchangeable under appropriate circumstances and that the embodiments of the invention described herein can be used in a different order than described herein. In case the terms relate to steps of a technique, method or use, there is no time or time interval coherence between the steps, i.e., the steps may be carried out simultaneously or there may be time intervals of seconds, minutes, hours, days, weeks, etc., between such steps, unless otherwise indicated.

It is to be understood that this invention is not limited to the particular methods, protocols, etc., described herein, since they may vary. It is also to be understood that the terminology used herein is for the purpose of describing particular embodiments only, and is not intended to limit the scope of the present invention that will be limited only by the appended claims.

The drawings are to be regarded as being schematic representations and elements illustrated in the drawings are not necessarily shown to scale. Rather, the various elements are represented such that their function and general purpose become apparent to a person skilled in the art. Unless defined otherwise, all technical and scientific terms used herein have the same meanings as commonly understood by a person of ordinary skill in the art.

As mentioned above, the present invention relates to a system comprising: at least one in-vitro diagnosis device, which is configured to carry out a diagnostic assay, the in-vitro diagnosis device being configured to detect a deviation of an internal calibration/control measurement parameter from a defined standard value, or a calibration curve, and forward it to a control unit; at least one control unit, which is bidirectionally connected to the at least one in-vitro diagnosis device and is configured to evaluate the deviation of an internal calibration/control measurement parameter from a defined standard value of the at least one in-vitro diagnosis device, the control unit additionally accessing data from a database for the evaluation; wherein the control unit is configured to modify the standard value, for which a deviating internal calibration/control measurement parameter has been detected, and to transmit the modified standard value to the in-vitro diagnosis device that detected the deviation, in order to make it possible to provide a consistent result value by the in-vitro diagnosis device.

The term "calibration/control measurement parameter" is used in the present case for calibration and/or control measurement parameters.

The term "in-vitro diagnosis device" as used here refers to a device that is configured so that it can carry out a diagnostic assay, or can determine the results of a diagnostic assay, preferably fully automatically or semiautomatically, that is carried out on a sample, preferably a biological sample. The in-vitro diagnosis device may have different forms and functions, for example, being configured as a stand-alone device or being operated in the form of an integrated in-vitro diagnosis large-scale device or in conjunction with further devices. It is typically configured to carry out various diagnostic tests or assays. In order to carry out a different test, corresponding reagents, controls, standards and test protocols are employed, which may differ depending on the form of the assay, the scope of the assay, and the aim of the assay.

A "sample" in the context of the invention is intended to mean the material that is likely to contain a substance to be detected (the analyte). The term "sample" includes, in particular, biological fluids of humans or animals, for example, blood, plasma, serum, sputum, exudate, bronchoalveolar lavage, lymph, synovial fluid, semen, vaginal mucus, feces, urine, liquor, or alternatively, for example, tissue samples or cell culture samples correspondingly prepared, for example, by homogenization or cell lysis, for photometric, preferably nephelometric determination. Furthermore, for example, vegetable fluids or tissue, forensic samples, water samples and wastewater samples, foodstuffs, pharmaceuticals, which are optionally to be subjected to a corresponding sample preparation before the determination, may also be used as a sample.

Carrying out a diagnostic assay preferably comprises measuring the concentration and/or the activity of one or more analytes in a sample by means of quantitative and/or qualitative detection. The term "quantitative detection" also includes semiquantitative methods, which only record the approximate amount, concentration, or activity of the analyte in the sample or can only be used for a relative quantity, concentration, or activity specification. Qualitative detection is intended to mean detection of the actual presence of the analyte in the sample or specification that the amount, concentration, or activity of the analyte in the sample lies below or above one particular threshold value or a plurality of particular threshold values.

Each assay in this case typically has its own control system, that is to say standardized control material/calibration material, which is tested at regular time intervals, for example, daily or weekly, before actual patient samples can be studied.

The reagents used for in-vitro assays are generally produced in batches and must satisfy predetermined setpoint values for concentration, activity, etc. Furthermore, specifically determined batch-specifically assigned values, which may vary from batch to batch and must be taken into account when carrying out the assays, may be assigned to the reagents. Such batch-specific values are typically indicated on the accompanying product documentation with the product packaging, and may be read in or used for carrying out the assays. After input into the in-vitro diagnosis device, these values are taken into account by the latter when carrying out an assay. Reagents normally change their properties over particular periods of time, that is to say increased or reduced reactivity or increased or reduced signals may occur, depending on the duration of the storage of the reagents or of the batch, or other factors. This is typically understood as a dynamic process, which may lead to measurement differences of up to 20%. Reading in data points that have been collected during production is therefore variable especially for reagents stored over a prolonged period, and may vitiate the measurement results.

The in-vitro diagnosis devices according to the invention are typically connected in a network to further components. Such a network may be an Internet- or intranet-based network. A connection of the device to further components may furthermore be established by means of short-range connections such as Bluetooth, Wi-Fi, ZigBee, or the like. By means of the link to a network, the in-vitro diagnosis device may be incorporated into a system and connected to other components of the system, in order to allow data exchange. The term "system" as used herein therefore refers to both a single link of one in-vitro diagnosis device to a network having additional components, for example, a control unit, and a group or multiplicity of in-vitro diagnosis devices which are connected to a network having a control unit (or optionally a plurality of interacting control units). Depending on the structure and concept, the system may contain one or more additional components. For instance, various types of devices may be incorporated, and data resources of reagent manufacturers, software producers, device manufacturers, etc., may be incorporated. In particular embodiments, furthermore, government authorities, for example, health officials, regulatory agencies or medical practices, hospital departments/laboratories, etc., may be incorporated into the system, for instance, via database accesses.

Thus, in one preferred embodiment, an in-vitro diagnosis device is connected to a multiplicity of other in-vitro diagnosis devices, for example, all or most of the in-vitro diagnosis devices, for example, of a particular type or of a particular device series, for example, in a particular region, a particular city, a particular federal state, a particular country or continent may be networked, or they may be globally networked. In preferred embodiments, devices are connected to one another as fleet devices of the same type.

It is preferred for secure data connections to be employed within the network, or system. One example of a secure data connection concept, which is preferred in the scope of the invention, is Smart Remote Services (SRS). In this case, a bidirectional connection of the in-vitro diagnosis device to an SRS portal or access server is set up and location-independent access to local and server-stored data is thereby made possible. For example, the performance of the device hardware, its operating time or potential problems may be monitored with SRS support. Likewise, software-based maintenance of the devices may be carried out. By the bidirectionality of the linking of the in-vitro diagnosis devices into the described network, a control loop is generated, which exerts an adjusting or correcting function on the in-vitro diagnosis device. The control loop is preferably designed as a closed control loop and shielded from influences outside the secure data connection.

For secure data connections on the Internet, in the scope of the present invention virtual private networks (VPN), which cannot be viewed by third parties, are preferably employed.

The in-vitro diagnosis device is configured according to the invention to detect a deviation of an internal calibration/control measurement parameter from a defined standard value. The term "calibration/control measurement parameter" as used herein refers to all parameters, or measurement values, which are collected in an in-vitro diagnosis device in connection with carrying out an assay. This includes, for example, parameters or measurement values that are associated with the assay reagents used for carrying out the in-vitro diagnosis, for example, which are collected during use of the standardized control material/calibration material before or while carrying out the assays. Furthermore, the internal calibration/control measurement parameter may be a device system component parameter, that is to say it may reflect properties of particular system components such as optics, voltage, current, temperature, temperature rise, etc. In another embodiment, initial measurements of an internal calibration/control measurement parameter are used for determining the deviation. These may for example be first measurements after starting up the device, or measurements before carrying out a first assay on a working day or a work shift.

In another embodiment, a deviation from a calibration curve is detected. The term "calibration curve" as used herein refers to a curve or table for an in-vitro diagnosis device, which indirectly measures parameters and indicates values for the desired quantity as a function of the values of a sensor output. Such a curve is typically used when the calibration of an in-vitro diagnosis device has a large variation from sample to sample or varies with time or the use. The calibration curve in this case typically shows the way in which the analytical signal changes, for example, with the concentration of reagents or the substance to be measured.

Collected calibration/control measurement parameters or generated calibration curves are compared according to the invention in the in-vitro diagnosis device with established standard values or standard curves. Such comparisons may preferably be carried out by components internal to the device, for example, so-called offset detectors, and projected onto different periods of time, for example, hours, days, weeks, months, etc. The "standard values", which are used as a comparison reference, include for example the batch-dependent target values, technical specifications relating to the devices, assay-dependent values, etc. These values are either entered manually into the in-vitro diagnosis devices or sent via a network or a communication connection to the devices. Changes of standard values, for example, in the scope of a batch change or device maintenance, are typically stored in the in-vitro diagnosis device. The approach according to the invention in this case additionally provides for changing of the standard values by means of correction factors in the control loop model described herein.

For this purpose, in a first step, after detection of a deviation of a calibration/control measurement parameter from a standard value, the measured difference is transmitted to a control unit. The "control unit" may be an electronic or computer-assisted component, which is preferably connected to the in-vitro diagnosis device via a network link. The control unit is configured to evaluate the deviation of an internal calibration/control measurement parameter from a defined standard value of the at least one in-vitro diagnosis device. The control unit may thus, in particular, evaluate deviations from a defined standard value as a function of assay reagent batches used.

In this case, a difference or deviation of the internal calibration/control measurement parameter that relates to assay reagents from standard values, which is detected by the in-vitro diagnosis device, is transmitted to the control unit and compared with existing data. The comparison may for example be carried out with current data or historical data, for example, with data that have been collected 12 h, 1, 2, 3, 4, 5, 6 days, 1, 2, 3 weeks, 1, 2, 3, 4, 5, 6, 7, 8, 9, 10, 11 months, 1, 2, 3 years, etc., before, or over the entire life cycle of the in-vitro diagnosis device. Advantageously, the comparison may likewise be carried out with data of other in-vitro diagnosis devices. In this case, either historical data of these devices or current data may be employed. Such an evaluation may be used to identify change patterns or variation trends or shifts of the assay performance, or dynamic processes, in a multiplicity of in-vitro diagnosis devices.

In addition or as an alternative, the deviation from a defined standard value is evaluated by the control unit as a function of values that are collected or transmitted by device system components. Here, current and historical values as mentioned above of the same device or of a multiplicity of devices may be evaluated.

In addition or as an alternative, the deviation from a defined standard value is evaluated by the control unit as a function of values that are collected or transmitted in respect of the device type. Here, current and historical values of all or a multiplicity of devices of the same type, optionally of the same build year, the same maintenance period, etc., may be evaluated.

Evaluation of the deviations as a function of device system components or device types makes it possible to identify system variabilities in devices, which are attributable to device components or which are influenced by the device type. In this way, it is possible to identify individual devices or device types or device groups that have technical problems, that is to say, for example, hardware problems. In the event of reproducibility of the problems, either response may be made with an (adjusted) modification of the standard values or alternative procedures may be proposed. This could, for example, be maintenance of the device or of a group of devices, replacement of device components, loading of new software, the use of particular reagents or the like. Furthermore, a warning may be given to the device user not to use the assay results for medical purposes or to repeat a test with a different device.

In another embodiment of the invention, not only internal calibration/control measurement parameters that relate to assays and device functions are transmitted by the in-vitro diagnosis devices to a control unit, but also specific diagnostic measurement results that have been obtained with patient samples by the assays. These measurement results, which are preferably transmitted in compliance with data protection via encrypted or secure connections, may be evaluated by the control unit in respect of existing change patterns or variation trends or shifts of the assay performance, or dynamic processes, in a multiplicity of assays of an in-vitro diagnosis device or of a multiplicity of in-vitro diagnosis devices. Advantageously, the number of measurement results that are obtained with patient samples is significantly more (a factor of from 100 to 1000) than the number of calibration/control measurement parameter values obtained. In this way, it is possible to detect a shift trend or change patterns more rapidly and more accurately and to increase the system performance, since it is to be assumed that general distribution patterns of patient results, for example, physiological and pathological results, are substantially consistent when a statistically significant number of in-vitro diagnosis devices can be evaluated and taken into account for the data analysis. In particular embodiments, the data of a patient sample measured with an assay, that is to say a “patient assay”, may be saved in a data memory associated with the control unit or in a database, in order to make them accessible for further analysis. Furthermore, the data obtained from patient assays may likewise be historically stored, or evaluated, that is to say data from different periods of time may be stored, compared, evaluated, etc., and a variation pattern may thereby possibly be detected. By the evaluation, it is possible to identify both device-specific deviations, which are for example attributable to hardware components, and assay reagent batch-dependent deviations.

In embodiments of the invention, the control unit is configured to receive and evaluate the detected deviations of a multiplicity of in-vitro diagnosis devices. The control unit is configured in preferred embodiments as a data analysis unit, that is to say it uses computer-based data evaluation techniques, for example, AI-assisted evaluation techniques, data mining techniques, etc. It is in other preferred embodiments connected to one or more database(s) and can take values and data from the latter and use them for evaluation of the transmitted differences of the calibration/control measurement parameters or calibration curve from the standard values. The database may for example provide batch-associated data, for example, target values or initial setpoint values for each in-vitro diagnosis device, hold assay-associated data, contain evaluation results of other devices connected to the control unit, or make warning messages of device manufacturers or other in-vitro diagnosis devices available, for example, relating to mechanical or technical problems of the devices. The database may furthermore contain data relating to patient assays as described above, for example, historical or current data of one, a plurality or a multiplicity of in-vitro diagnosis device(s), or of a multiplicity of assays carried out, optionally different assays that have been carried out with different assay reagent batches, etc.

Furthermore, the control unit may save data and evaluation results in the database(s) and make them available for other or future evaluation processes or other purposes.

After evaluation of the differences of the calibration/control measurement parameters or calibration curves from standard values, which are transmitted to the control unit, the standard value is modified by the control unit. The control unit of the system according to the invention is accordingly configured to modify the standard value and transmit it to the in-vitro diagnosis device. The “modification” may in this case be a reduction or increase of the standard value, as a function of the transmitted differences. Modified, that is to say increased or reduced, standard values are subsequently transmitted back to the in-vitro diagnosis device that reported the difference. This transmission may be carried out in particular embodiments via a correcting element, as represented in FIG. 1. The in-vitro diagnosis device subsequently, that is to say after transmission, carries out all further assays or tests on the basis of the modified standard value(s) until any new modification of the standard value is carried out by the control unit.

The modification of the standard values may, in particular embodiments, be controlled specifically by means of a threshold value method. In this case, the value, the number of messages, and the scatter of values beyond which modification should be carried out may be established (for example, by establishing a standard deviation and/or an absolute number of measurement values). It is furthermore possible to select whether a specific modification of an in-vitro diagnosis device is transmitted, and/or whether the modification is transmitted to a group of devices or all of the devices.

The modification of the standard value is preferably carried out by generating a correction factor for the standard value. The term “correction factor” as used herein refers to a change instruction for the standard value used on an in-vitro diagnosis device, for example, in respect of the assay calibration, or a device value. The change instruction may, for example, generate a reduction of the value or an increase of the value. This may be done by means of absolute value indications, formulae, or percentage change indications.

The correction factor may be composed of different partial correction factors or a group of correction factors, which may optionally be transmitted individually and assigned separately to the relevant components of the device, and relate to different deviation scenarios in an in-vitro diagnosis device.

For instance, a standard value may be modified by a correction factor that is determined on the basis of an individual deviation of an in-vitro diagnosis device from a standard value. This deviation may typically relate to the technical function of the device, or alternatively, the location of the device, the environmental variables such as temperature, air humidity, vibrations, insolation, operating personnel, times of day of assay conduct, etc. Corresponding deviations and optionally additional parameters may be ascertained by the device itself or alternatively obtained by means of additional external parameter acquisition at the location, for example, in the event of absence of sensors on the device.

Furthermore, a standard value may be modified by a correction factor that is determined on the basis of an assay reagent batch-dependent deviation of one or preferably a plurality of in-vitro diagnosis devices from a standard value. Such a deviation may, as mentioned above, be a variation pattern over the life cycle of a batch, or over a batch, which is employed on a plurality of in-vitro diagnosis devices. Typically, the deviation is established over fixed periods of time and may change dynamically. A correction factor correspondingly needs to be tracked and adjusted to the current deviation.

Furthermore, a standard value may be modified by a correction factor that is determined on the basis of a deviation of measurement data of patient assays from previous measurement data of patient assays, controls and/or calibrations. Such deviations may preferably, as mentioned above, be identified by evaluating a multiplicity of patient assay data at a location or a plurality of, preferably many locations, that is to say assays that have been carried out with a multiplicity of in-vitro diagnosis devices. Preferably, the evaluation of the patient assay data comprises a comparison with further evaluation results, for example, the assay reagent deviations and the device-specific deviations, in order to facilitate assignment of the deviation to particular problem areas.

Furthermore, a standard value may be modified by a correction factor that is determined on the basis of a device type-dependent deviation of a plurality of in-vitro diagnosis devices from a standard value. The device type-dependent deviation is typically a variability caused by specific components or properties of in-vitro diagnosis devices, which may be identified in all or the multiplicity of in-vitro diagnosis devices of a particular type, build year, manufacturing site or production location, etc. Patterns identified in the deviation behavior may be compensated for by correction factors for all corresponding devices.

Furthermore, a standard value may be modified by a correction factor that is determined on the basis of a device system component-dependent deviation of a plurality of in-vitro diagnosis devices from a standard value. Device system components may be checked by means of hardware checking or technical measurements of parameters such as optics, voltage, current, temperature, etc., or in the form of device self-tests for deviations from standard values. Such deviations may be device-specific, that is to say occur only in a particular device or in a group of devices. Corresponding correction factors are transmitted to the individual device or to the group of devices. The transmission of an individual correction factor may, in particular embodiments, be made dependent on predetermined threshold values being exceeded/fallen below.

In general, an individual deviation of one of the parameters described herein from standard values may be a signal for a malfunction of the specific device or of the reagents specifically used, etc. In cases in which an individual deviation has occurred but is not found as a variation pattern in other in-vitro diagnosis devices, a warning message is preferably transmitted to the in-vitro diagnosis device and/or the operator in charge, instead of a correction factor.

Furthermore, a standard value may be modified by a correction factor that is determined on the basis of a deviation of the measurement or calibration/control measurement parameters from measurement or calibration/control measurement parameters in a multiplicity of in-vitro diagnosis devices. The deviation from calibration/control measurement parameters in a multiplicity of in-vitro diagnosis devices may be evaluated by a control unit that is connected to a multiplicity of the devices. By a multiplication effect due to statistically evaluable amounts of data, a deviation trend may be determined more rapidly and more accurately. A correction factor may correspondingly be finely adjusted to all devices of the analyzed group. In this way, a very efficient closed control loop is established, which makes manual or individual correction of corresponding standard values superfluous and at the same time allows real-time monitoring that efficiently avoids errors and value deviations.

Furthermore, a standard value may be modified by a correction factor that is determined on the basis of a combination of a device system component-dependent deviation, an assay reagent batch-dependent deviation, and/or a deviation from measurement data of patient assays. In other embodiments this correction factor may be determined by combination with further deviations, as mentioned above. The correction factor may in this case be transmitted as an individual correction factor to the in-vitro diagnosis device and implemented by the device software in such a way that measurement variations are compensated for in all affected areas, or the correction factor may be transmitted as a group of partial correction factors for the respectively deviating components.

In other preferred embodiments of the invention, the at least one in-vitro diagnosis device is configured to determine the deviation of an internal calibration/control measurement parameter as defined above from a defined standard value at regular time intervals. These time intervals may depend on the parameters to be measured, the device type, the assay type, the reagents, the reagent age, or other factors. For example, a determination may be carried out once per hour, once per 12 h, per day, per 2, 3, 4, 5, 6 days, per week, per 2, 3 weeks, per month, per 2, 3, 4, 5, 6, 7, 8, 9, 10, 11 months, per year, etc., or over the life cycle of the in-vitro diagnosis device, the assay reagents, or a system component, or a part of the life cycle. Furthermore, the determination may be carried out once per work shift, at every operator change, after carrying out a particular number of assays, for example, after every 10th, 20th, 30th, 40th, 50th, 100th, 500th assay, etc. The conduct of the determination may be initiated by the in-vitro diagnosis device itself, or may be started by the control unit.

In another aspect, the present invention relates to a method for modifying a defined standard value of an internal calibration/control measurement parameter of at least one in-vitro diagnosis device, wherein the internal calibration/control measurement parameter measured in the in-vitro diagnosis device has a deviation from the standard value. The method in this case comprises forwarding of the deviation to at least one control unit, preferably as defined herein, evaluation of the deviation in the control unit and transmission of a standard value modified on the basis of the deviation to the in-vitro diagnosis device that detected the deviation.

In specific embodiments, measurement data of a patient assay are additionally forwarded to the control unit, as illustrated in the context of the system according to the invention.

In particularly preferred embodiments the deviation from initial measurements of the internal calibration/control measurement parameter and/or the deviation of the internal calibration/control measurement parameter from a defined standard value is forwarded at defined time intervals. For example, these forwardings may take place once per hour, per 12 h, per day, per 2, 3, 4, 5, 6 days, per week, per 2, 3 weeks, per month, per 2, 3, 4, 5, 6, 7, 8, 9, 10, 11 months, per year etc., or over the life cycle of the in-vitro diagnosis device, the assay reagents or a system component or a part of the life cycle.

In a specific step, the method according to the invention comprises transmitting and evaluating deviations of internal calibration/control measurement parameters that are associated with the assay reagents used for carrying out the in-vitro diagnosis, as defined herein, or of device system component parameters. Furthermore, included is the transmission and evaluation of deviations from a defined standard value as a function of assay reagent batches used, device system components and/or the device type, as defined herein. Preferably, this includes internal calibration/control measurement parameters, or deviations thereof, of a multiplicity of in-vitro diagnosis devices.

In one particularly preferred embodiment of the method according to the invention, a standard value as defined herein is modified by a correction factor. This correction factor is, as mentioned in detail above, determined on the basis of (i) an individual deviation of an in-vitro diagnosis device from a standard value, (ii) an assay reagent batch-dependent deviation of a plurality of in-vitro diagnosis devices from a standard value, (iii) a deviation of measurement data of patient assays from previous measurement data of patient assays, (iv) a device type-dependent deviation of a plurality of in-vitro diagnosis devices from a standard value, (v) a device system component-dependent deviation of a plurality of in-vitro diagnosis devices from a standard value, (vi) a deviation of the measurement or calibration/control measurement parameters from measurement or calibration/control measurement parameters in a multiplicity of in-vitro diagnosis devices, and/or (vii) a deviation that is determined on the basis of a combination of a device system component-dependent deviation, an assay reagent batch-dependent deviation, and/or a deviation from measurement data of patient assays.

The examples and figures are provided for illustration. It is thus to be understood that the examples and figures are not to be construed as limiting. A person skilled in the art will clearly be able to envisage further modifications of the principles laid out herein.

Independent of the grammatical term usage, individuals with male, female or other gender identities are included within the term.

EXAMPLES

Example 1

The following description relates to an aPTT assay with a first reagent batch (Batch #1). This assay was in this case assigned a batch-specific value at the end of manufacture in which the assay indicates an upper normal value (31 seconds) for a standardized physiological sample.

From the measurement data obtained of all in-vitro diagnosis systems that use this assay and batch and employ control materials that are actually intended to deliver the same values reproducibly, it was found that the average values of the results had increased continuously over a defined period of time, 3 months.

The offset detector used indicated a rise of 2.7 seconds over a period of 3 months.

With a further linear continuation of the rise over a run time of 18 months this would mean an artificial false result increase from originally 31 seconds by 2.7 seconds to 33.7 seconds.

Figure 3:
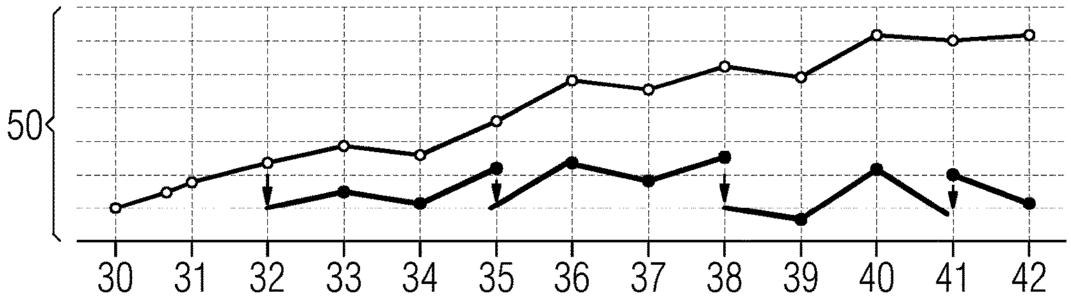
FIG. 3 shows a schematized measurement curve of an assay without adjustment (upper curve) and with adjustment according to the invention (lower, broken curve). The measurement instants are entered on the abscissa (30, 31, 32, 33, 34, 35, 36, 37, 38, 39, 40, 41, 42). The respectively measured values (50) are plotted on the ordinate. As may be seen from the figure, adjustments of the parameter values are necessary after particular measurement instants (32, 35, 38, 41), in order to allow consistent result values by the in-vitro diagnosis device.

The offset detector calculated the difference, and a control element determined therefrom a resulting correction factor. The assay application was therefore able to indicate correct measurement values despite increased signal values, and provide them to the laboratory and medical professional (see also FIG. 3).

The invention claimed is:

1. A system, comprising:

at least one in-vitro diagnosis device, which is configured to carry out a diagnostic assay, the at least one in-vitro diagnosis device configured to detect a deviation of an internal calibration/control measurement parameter from a defined standard value, or a calibration curve, and forward it to a control unit; and at least one control unit, which is bidirectionally connected to the at least one in-vitro diagnosis device and is configured to perform an evaluation of the deviation of an internal calibration/control measurement parameter from a defined standard value of the at least one in-vitro diagnosis device, the at least one control unit additionally accessing data from a database for the evaluation;

wherein the at least one control unit is configured to modify the standard value, for which a deviating internal calibration/control measurement parameter has been detected, and to transmit the modified standard value to the at least one in-vitro diagnosis device that detected the deviation to provide a consistent result value by the at least one in-vitro diagnosis device;

wherein the at least one control unit is also configured to transmit the modified standard value to one or more additional in-vitro diagnosis devices for implementation by the one or more additional in-vitro diagnosis devices until the at least one control unit further modifies the modified standard value; and wherein deviations of an internal calibration/control measurement parameter from the modified standard value generated by the one or more additional in-vitro diagnosis devices are transmitted back to the at least one control unit for further evaluation of the modified standard value.

2. The system as claimed in claim 1, wherein the internal calibration/control measurement parameter is associated with assay reagents used for carrying out the in-vitro diagnosis.

3. The system as claimed in claim 1, wherein the internal calibration/control measurement parameter is a device system component parameter.

4. The system as claimed in claim 1, wherein the at least one control unit is configured to perform evaluations of deviations from a defined standard value as a function of assay reagent batches used, the device system components, or the device type.

5. The system as claimed in claim 1, wherein the at least one in-vitro diagnosis device is configured additionally to forward measurement data of a patient sample measured with a patient assay to the at least one control unit.

6. The system as claimed in claim 5, wherein the at least one control unit is additionally configured to evaluate the measurement data of the patient assay with the aid of previous measurement data of patient assays,
controls or calibrations.

7. The system as claimed in claim 1, wherein the evaluation comprises a comparison of the deviations of an internal calibration/control measurement parameter and measurement data of patient assays of a multiplicity of in-vitro diagnosis devices.

8. The system as claimed in claim 1, wherein the at least one control unit is configured to access a database containing data relating to the measurement or calibration/control measurement parameters associated with assay reagents or containing data relating to the device system component parameters or containing data relating to patient assays.

9. The system as claimed in claim 4, wherein the standard value is modified by a correction factor determined by:

(i) an individual deviation of an in-vitro diagnosis device from a standard value, (ii) an assay reagent batch-dependent deviation of a plurality of in-vitro diagnosis devices from a standard value, (iii) a deviation of measurement data of patient assays from previous measurement data of patient assays, (iv) a device type-dependent deviation of a plurality of in-vitro diagnosis devices from a standard value, (v) a device system component-dependent deviation of a plurality of in-vitro diagnosis devices from a standard value, (vi) a deviation of the measurement or calibration/control measurement parameters from measurement or calibration/control measurement parameters in a multiplicity of in-vitro diagnosis devices, or (vii) a combination of a device system component-dependent deviation, an assay reagent batch-dependent deviation, or a deviation from measurement data of patient assays.

10. The system as claimed in claim 1, wherein the at least one in-vitro diagnosis device is configured to detect the deviation of an internal calibration/control measurement parameter from a defined standard value once per hour, per 12 hours, per day, per 2, 3, 4, 5, 6 days, per week, per 2, 3 weeks, per month, per 2, 3, 4, 5, 6, 7, 8, 9, 10, 11 months, per year or over the life cycle of the at least one in-vitro diagnosis device, assay reagents or a system component or a part of the life cycle, and forward it to the at least one control unit.

11. A method for modifying a defined standard value of an internal calibration/control measurement parameter of at least one in-vitro diagnosis device, wherein the internal calibration/control measurement parameter measured in the in-vitro diagnosis device has a deviation from the standard value, comprising:

forwarding the deviation to at least one control unit, evaluating the deviation in the at least one control unit, transmitting a standard value modified by the at least one control unit on the basis of the deviation to the at least one in-vitro diagnosis device that detected the deviation and to one or more additional in-vitro diagnosis devices for implementation by the one or more additional in-vitro diagnosis devices until the modified standard value is further modified, and transmitting deviations of an internal calibration/control measurement parameter from the modified standard value generated by the one or more additional in-vitro diagnosis devices are transmitted back to the at least one control unit for further evaluation of the modified standard value.

12. The method as claimed in claim 11, wherein the internal calibration/control measurement parameter is associated with assay reagents used for carrying out the in-vitro diagnosis, or is a device system component parameter.

13. The method as claimed in claim 11, wherein the evaluating the deviation from a defined standard value is carried out as a function of assay reagent batches used, the device system components, or the device type.

14. The method as claimed in claim 11, wherein the evaluating comprises a comparison of the deviations of an internal calibration/control measurement parameter of a multiplicity of in-vitro diagnosis devices.

15. The method as claimed in claim 11, wherein the standard value is modified by a correction factor that is determined by:

(i) an individual deviation of an in-vitro diagnosis device from a standard value, (ii) an assay reagent batch-dependent deviation of a plurality of in-vitro diagnosis devices from a standard value, (iii) a deviation of measurement data of patient assays from previous measurement data of patient assays, (iv) a device type-dependent deviation of a plurality of in-vitro diagnosis devices from a standard value, (v) a device system component-dependent deviation of a plurality of in-vitro diagnosis devices from a standard value, (vi) a deviation of the measurement or calibration/control measurement parameters from measurement or calibration/control measurement parameters in a multiplicity of in-vitro diagnosis devices, or (vii) a combination of a device system component-dependent deviation, an assay reagent batch-dependent deviation, or a deviation from measurement data of patient assays.

16. The method as claimed in claim 11, further comprising forwarding measurement data of a patient assay to the at least one control unit.

17. The method as claimed in claim 11, further comprising detecting and forwarding periodically to the at least one control unit the deviation from initial measurements of the internal calibration/control measurement parameter or the deviation of the internal calibration/control measurement parameter from a defined standard value.

18. The method as claimed in claim 17, wherein the forwarding periodically occurs once per hour; per 12 hours; per day; per 2, 3, 4, 5, 6 days; per week; per 2, 3 weeks; per month; per 2, 3, 4, 5, 6, 7, 8, 9, 10, 11 months; per year; or over the life cycle of the at least one in-vitro diagnosis device, assay reagents, or a system component or a part of the life cycle.

* * * * *